(12) United States Patent
Kwon

(10) Patent No.: US 9,989,802 B2
(45) Date of Patent: Jun. 5, 2018

(54) DISPLAY DEVICE INCLUDING REFLECTIVE SHEET HAVING COVER PART

(71) Applicant: Samsung Display Co., Ltd., Yongin-Si, Gyeonggi-Do (KR)

(72) Inventor: Myung-seok Kwon, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 170 days.

(21) Appl. No.: 14/985,594

(22) Filed: Dec. 31, 2015

(65) Prior Publication Data

US 2016/0223865 A1     Aug. 4, 2016

(30) Foreign Application Priority Data

Jan. 29, 2015   (KR) ........................ 10-2015-0014566

(51) Int. Cl.
*G02F 1/1335*       (2006.01)
(52) U.S. Cl.
CPC .. *G02F 1/133605* (2013.01); *G02F 1/133603* (2013.01); *G02F 1/133606* (2013.01); *G02F 1/133608* (2013.01); *G02F 2001/133607* (2013.01)
(58) Field of Classification Search
CPC ......... G02F 1/133605; G02F 1/133603; G02F 1/133608
See application file for complete search history.

(56) References Cited

U.S. PATENT DOCUMENTS

| 8,579,454 | B2 | 11/2013 | Kuromizu |
| 2005/0270671 | A1 | 12/2005 | Nousou et al. |
| 2012/0140446 | A1* | 6/2012 | Seetzen ............. G02F 1/133605 362/97.1 |
| 2012/0212682 | A1* | 8/2012 | Kuromizu ................ G02B 3/08 348/739 |

FOREIGN PATENT DOCUMENTS

| KR | 10-1246883 | B1 | 3/2013 |
| KR | 1020140066842 | A | 6/2014 |
| KR | 1020140076723 | A | 6/2014 |

* cited by examiner

*Primary Examiner* — Karabi Guharay
(74) *Attorney, Agent, or Firm* — Cantor Colburn LLP

(57) ABSTRACT

A liquid crystal display device includes a backlight unit and a display panel. The backlight unit includes a light source member and a reflective sheet. The light source member includes light emitting elements, and the light emitting elements include a lens totally reflecting light laterally towards a side surface of backlight unit. The reflective sheet defines a bottom part and cover parts. The bottom part extends to be disposed under the light source member and defines a plurality of opening parts of the first reflective sheet. The cover parts are respectively bent from one side of each of the opening parts toward the display panel. Also, the cover parts are in one-to-one correspondence with the opening parts.

20 Claims, 7 Drawing Sheets

DISPLAY DEVICE INCLUDING REFLECTIVE SHEET HAVING COVER PART

This application claims priority to Korean Patent Application No. 10-2015-0014566, filed on Jan. 29, 2015, and all the benefits accruing therefrom under 35 U.S.C. § 119, the entire contents of which are hereby incorporated by reference.

BACKGROUND (1) Field

The invention disclosed herein relates to a non-light emitting display device, and more particularly to a non-light emitting display device including a reflective sheet capable of improving display quality.

(2) Description of the Related Art

Since non-light emitting display devices such as liquid crystal display devices have display panels which display images and are not self-emissive, the non-light emitting display devices include backlight units for generating and providing light to the display panels.

A backlight unit includes light emitting diodes ("LEDs"). LEDs have relatively lower power consumption and better color reproduction as compared to cold cathode fluorescent lamps. A backlight unit having LEDs includes a light emitting unit which is provided in plurality and emits light generated from a light emitting element therein. The light emitting units include a light emitting element provided in plurality and connected to each other, respectively. The light emitting elements may be the LEDs.

The backlight unit further includes a reflective sheet. The reflective sheet reflects the light emitted from the light emitting unit to provide the light to the display panel.

SUMMARY

One or more exemplary embodiment provides a liquid crystal display device capable of providing uniform light to a display panel.

Exemplary embodiments of the invention provide a display device including a backlight unit and a display panel. The backlight unit generates light. The backlight unit includes a light source member and a first reflective sheet.

The light source member includes a plurality of light emitting elements which generates the light. The first reflective sheet is disposed under the light source member.

The first reflective sheet includes a bottom part thereof and a plurality of cover parts thereof. The bottom part is extended to be disposed under the light source member and defines a plurality of opening parts of the first reflective sheet. The plurality of cover parts is bent from the bottom part at one side of each of the opening parts toward the display panel, and is in one-to-one correspondence with the plurality of opening parts.

In still other embodiments, an angle respectively defined by each of the plurality of cover parts and the bottom part may be greater than about 90 degrees and smaller than about 180 degrees.

In even other embodiments, each of the plurality of light emitting elements may include a light emitting diode ("LED") chip and a lens.

In still other embodiments, the LED chip may generate the light. The lens may cover the LED chip and totally reflect the light toward the cover parts. An angle defined by the totally reflected light toward the cover parts and a normal line to the bottom part defined by the first reflective sheet may be about 70 to about 110 degrees.

In even other embodiments, the plurality of cover parts may be disposed around the light source member in a top plan view. The plurality of cover parts may be disposed along the edges of the bottom part to surround the light source member in the top plan view.

In further embodiments, each of the plurality of cover parts may include a reflective surface and a non-reflective surface.

In still further embodiments, the reflective surface may be disposed to face the light source member. The non-reflective surface may be disposed at an opposite side to the reflective surface such that the light is not incident thereon.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention.

DETAILED DESCRIPTION

Figure 1:
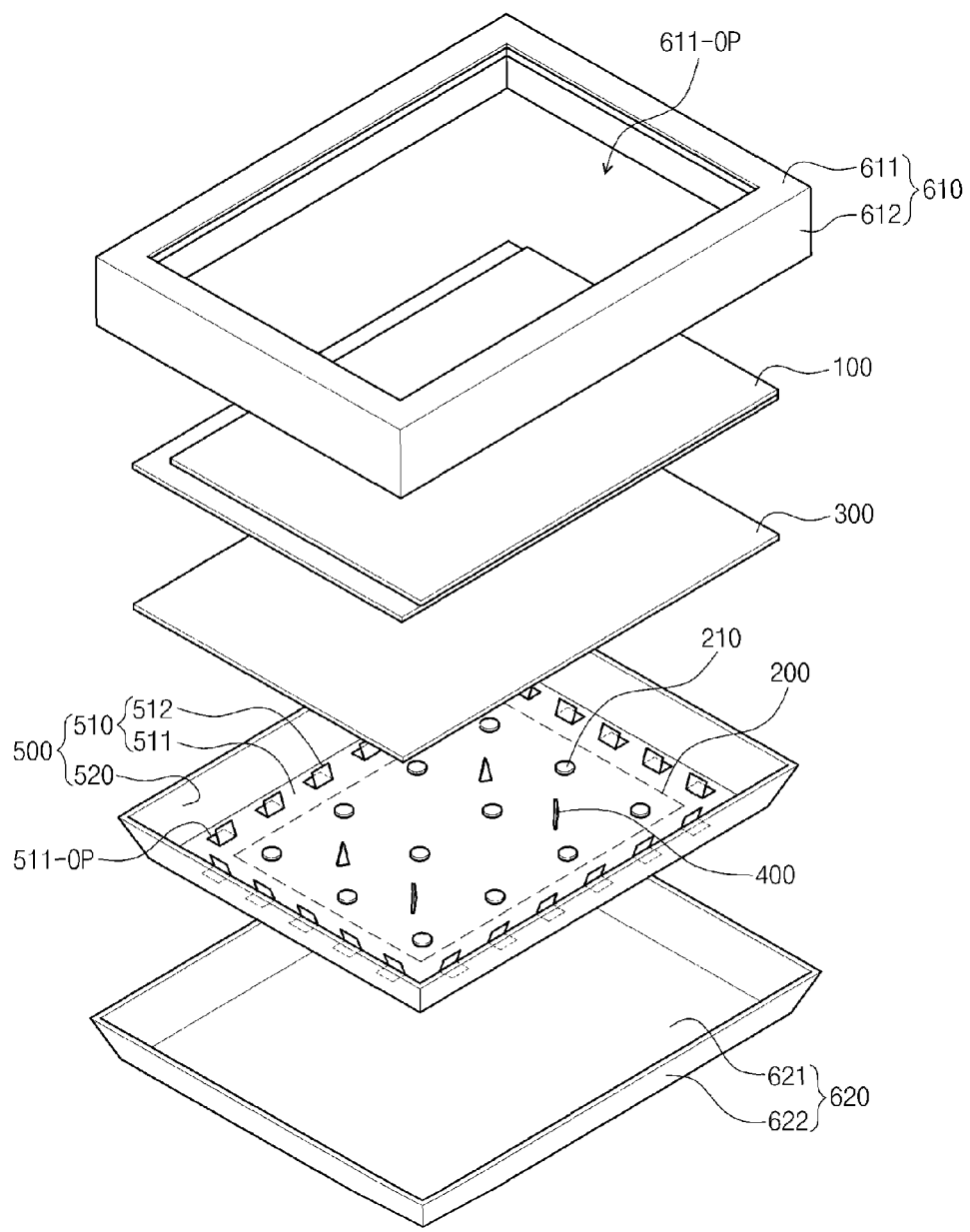
FIG. 1 is an exploded perspective view illustrating an exemplary embodiment of a display device according to the invention.

The invention may be modified in several different forms, and exemplary embodiments will be exemplified in the drawings and described in detail. It is to be understood that the invention is not limited to the disclosed exemplary embodiments, and is intended to cover various modifications and equivalent arrangements included within the spirit and scope of the disclosure, including the appended claims.

In the figures, the scales of some components are exaggerated or reduced for clearer illustration of layers and regions. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments will be described in more detail with reference to the accompanying drawings.

Figure 2:
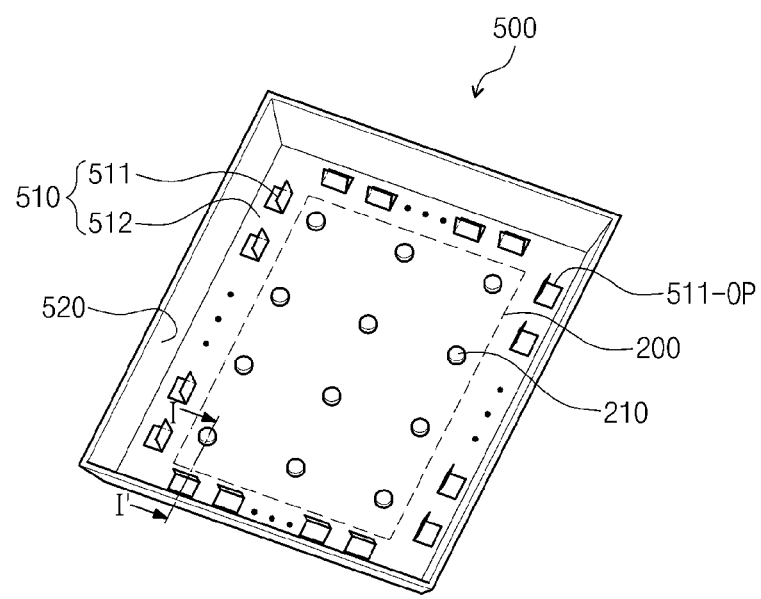
FIG. 2 is a perspective view illustrating an exemplary embodiment of a reflective sheet of the display device illustrated in FIG. 1.
Figure 3:
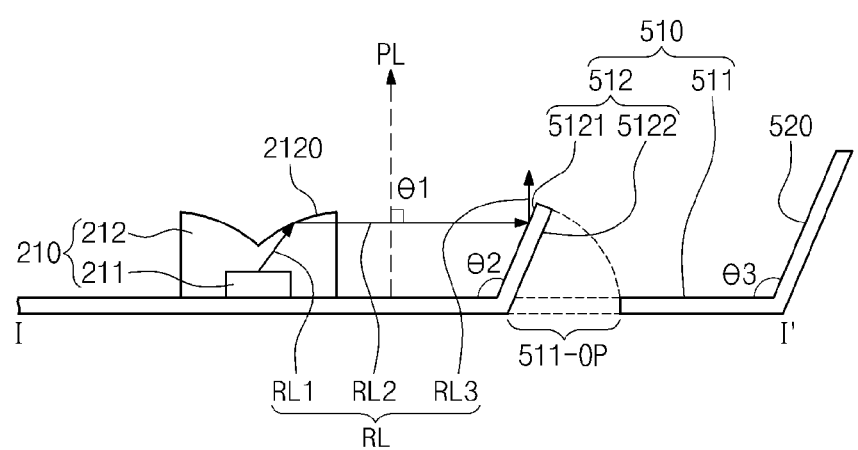
FIG. 3 is a cross-sectional view taken along line I-I' of FIG. 2.

FIG. 1 is an exploded perspective view illustrating an exemplary embodiment of a liquid crystal display device according to the invention. FIG. 2 is a perspective view illustrating an exemplary embodiment of a reflective sheet of the liquid crystal display device illustrated in FIG. 1. FIG. 3 is a cross-sectional view taken along line I-I' of FIG. 2.

As illustrated in FIG. 1, an exemplary embodiment of a display device according to the invention includes a display panel 100, a light source member 200, an optical member 300, an optical member supporter 400, a reflective sheet 500, and protective members 610 and 620. Among these components, the light source member 200, the optical member 300, the optical member supporter 400, and the reflective sheet 500 constitute a backlight unit.

The display panel 100, the light source member 200, the optical member 300, the optical member supporter 400 and the reflective sheet 500 are protected by the protective members 610 and 620.

The display panel 100 does not emit light and is therefore not self-emissive. The display panel 100 receives light from the light source member 200 to display images. The non-emissive display panel 100 is not particularly limited, for example, and may include various display panels, such as liquid crystal display panels, electrophoretic display panels, electrowetting display panels and the like.

Where the display panel 100 is a liquid crystal display panel, a first display substrate, a second display substrate facing the first display substrate, and a liquid crystal layer disposed between the first and second display substrates are included as elements of the liquid crystal display panel. The liquid crystal display panel may be subdivided into a display region and a border region surrounding the display region. The display region is a region in which an image is displayed on a plane, and the border region is a region which is adjacent to the display region on the plane and in which an image is not displayed (e.g., a non-display region).

The light source member 200 is disposed under the display panel 100 to provide light to the display panel 100. The light source member 200 collectively includes a light emitting element 210 provided in plurality, each of which defines a point light source and generates light. Each of the plurality of light emitting elements 210 may be constituted of a light emitting diode.

The optical member 300 is disposed under the display panel 100. The optical member 300 receives light from the light source member 200. The optical member 300 improves the optical characteristics of the received light and provides the light to the display panel 100. The optical member 300 is disposed on the reflective sheet 500 to cover the light source member 200, and receives light from the light source member 200 to guide the light toward the display panel 100.

The optical member 300 may include a diffuser sheet. In addition, the optical member 300 may further include a prism sheet and/or a protective sheet. The optical member 300 may include a material having a refractivity of about 1.2 to about 1.8, for example, a material such as polycarbonate or polymethyl methacrylate.

The optical member supporter 400 is disposed under the optical member 300 to support the optical member 300. The optical member supporter 400 may be provided in plurality. The plurality of optical member supporters 400 may be disposed to be spaced a constant distance from one another.

The reflective sheet 500 is disposed under the optical member 300 and reflects the light generated by the light source member 200. The light source member 200 and the optical member supporter 400 are disposed on the reflective sheet 500.

Referring to FIGS. 2 and 3, the reflective sheet 500 will be described in detail. In FIG. 2, only the reflective sheet 500 and the light source member 200 are illustrated for convenience. The reflective sheet 500 includes a first reflective sheet 510 and a second reflective sheet 520. Portions of the reflective sheet 500 may define the first and second reflective sheets 510 and 520 thereof. The light source member 200 is disposed on the first reflective sheet 510.

The first reflective sheet 510 defines a bottom part 511 thereof and a cover part 512 thereof which is provided in plurality. The bottom part 511 defines an opening part 511-OP of the first reflective sheet 510 provided in plurality. Portions of the bottom part 511 define the plurality of opening parts 511-OP Portions of the bottom part 511 of the first reflective sheet 510 extend to define the plurality of cover parts 512 bent from one side of each of the plurality of opening parts 511-OP toward the display panel 100. The plurality of cover parts 512 is disposed in one-to-one correspondence with the plurality of opening parts 511-OP.

In an exemplary embodiment of manufacturing the reflective sheet 500, the plurality of cover parts 512 may be formed through a process of cutting portions of the bottom part 511 and bending the cut portions. The portions thus cut and bent correspond to the cover parts 512, and the holes remaining in the bottom part 511 after the cutting and bending correspond to the opening parts 511-OP. Accordingly, the plurality of cover parts 512 is disposed in one-to-one correspondence with the plurality of opening parts 511-0P.

The angle defined by each of the plurality of cover parts 512 and the bottom part 511 may be greater than about 90 degrees and smaller than about 180 degrees. In one exemplary embodiment, the angle defined by each of the plurality of cover parts 512 and the bottom part 511 may be about 100 degrees to about 130 degrees.

The plurality of cover parts 512 may be disposed around the light source member 200 in a top plan view. The plurality of cover parts 512 reflect a portion of the light generated by the light source member 200 toward the display panel 100. That is, the direction of the light emitted laterally (e.g., toward a side surface of the display device or reflective sheet 500) from the light source member 200 is switched to an upward direction toward the display panel 100. The plurality of cover parts 512 is disposed closer to edges of the bottom part 511 than to the light source member 200.

The plurality of cover parts 512 may be disposed along the vicinity of outer edges of the bottom part 511 to surround the light source member 200 in the top plan view. As a result of measuring the brightness of a backlight unit, the cover parts 512 may be disposed at a darker portion of the backlight unit rather than at other surrounding portions of the backlight unit. This will be described in detail with reference to FIG. 3.

The cover parts 512 may be disposed to be spaced a constant distance from one another. That is, each of the distances between the adjacent cover parts 512 may be equal to each other. However, the invention is not limited thereto, and the cover parts 512 may be disposed to be spaced at different distances from one another, according to a brightness characteristic of the backlight unit. In one exemplary embodiment, for example, when a portion (or group) of the cover parts 512 is arranged in one direction, the distances between the cover parts of the group disposed at the center of the group from among the cover parts may be greater than the distances between the cover parts of the group disposed at an end of the group.

A planar shape of the cover parts 512 may be polygonal. However, the invention is not limited thereto, and this will be described below in detail with reference to FIGS. 5 to 7.

Also, each of the cover parts 512 may be similar to each other, such as in shape, size and the like. However, the invention is not limited thereto, and the size of each of the cover parts 512 may not be equal or the same as each other but may be different from each other.

The second reflective sheet 520 is disposed extended from the outer edges of the bottom part 511. The bottom part 511 may extend to define the second reflective sheet 520 of the reflective sheet 500. The angle defined by the second reflective sheet 520 and the bottom part 511 may be greater than about 90 degrees and smaller than about 180 degrees. Where the angle defined by the bottom part 511 and the second reflective sheet 520 is an obtuse angle, the second reflective sheet 520 is able to reflect the light, which is emitted laterally from the light source member 200 disposed on the bottom part 511 toward a side surface of the display device or reflective sheet 500, toward the display panel 100. If the angle defined by the bottom part 511 and the second reflective sheet 520 is not an obtuse angle, the second reflective sheet 520 may not be able to reflect the light, which is emitted laterally from the light source member 200 disposed on the bottom part 511 toward a side surface of the display device or reflective sheet 500, toward the display panel 100.

In FIG. 3, corresponding to line I-I' of FIG. 2, a cross-section of one emitting element 210 from among the plurality of emitting elements 210 and a cross-section of the reflective sheet 500 are illustrated.

Each of the plurality of light emitting elements 210 includes a light emitting diode ("LED") chip 211 and a lens 212.

The LED chip 211 receives electric energy from outside the LED chip 211, and converts the received electric energy to light energy to generate light RL. The LED chip 211 provides the generated light to the lens 212.

The lens 212 totally reflects the light RL generated by the LED chip 211 toward the cover parts 512 disposed at a side of the LED chip 211. However, due to characteristics of the LED chip 211 and the lens 212, there may be some light which is not totally reflected.

The lens 212 includes a lens surface 2120 which has a curved convex shape taken from the center of the lens 212 to the outer portion thereof. That is, the lens shape is similar to a shape which is formed by truncating or cutting a cylinder-shaped or hemisphere-shaped lens from the top into a cone shape. This is, the above description is only for describing forming an exemplary shape, and does not limit a manufacturing method thereof. However, the shape of the lens 212 is not limited thereto, and includes various shapes capable of reflecting the light RL generated by the LED chip 211 toward the cover parts 512.

The light RL generated by the LED chip 211 may be subdivided into first light RL1, second light RL2 and third light RL3.

The first light RL1 is the light incident on the lens surface 2120 after being generated by the LED chip 211. The first light RL1 may be considered as directly incident on the lens surface 2120. The second light RL2 is the light generated by the first light RL1 reflected or totally reflected by the lens surface 2120. A first angle θ1 defined by the second light RL2 and the line PL normal to the first reflective sheet 510 may be about 70 degrees to about 110 degrees. When the first angle θ1 is about 70 degrees to about 110 degrees, the second light RL2 does not travel toward the display panel 100 but instead travels toward the cover parts 512. The third light RL3 is the second light RL2 reflected by the cover parts 512 to travel toward the display panel 100 after being reflected by the cover parts 512.

The plurality of light emitting elements 210 within the light source member 200 provides a surface light source required to provide light to the display device. In order to provide a high quality display device, the brightness of the surface light source should be entirely uniform. In order to provide the uniform surface light source, the backlight unit should have a predetermined thickness in a cross-sectional directly thereof so that the light generated by the light emitting elements 210 may be uniformly diffused.

As illustrated in FIG. 3, when the light emitting elements 210 reflect the light RL laterally towards the side surface of the display device or reflective sheet 500, the cross-sectional thickness of the backlight unit is reduced than where light emitting elements having other structures. That is, when the lens 212 illustrated in FIG. 3 is used, a display device having a smaller cross-sectional thickness and high quality may be provided.

Each of the cover parts 512 includes a reflective surface 5121 and a non-reflective surface 5122. The reflective surface 5121 is disposed to face the light emitting elements 210, so that the second light RL2 is incident thereon. The reflective surface 5121 is disposed opposite to the non-reflective surface 5122. In exemplary embodiments, the reflective and non-reflective surfaces 5121 and 5122 may have the same planar area as each other, but the invention is not limited thereto.

A second angle θ2 defined by each of the plurality of cover parts 512 and the bottom part 511 may be greater than about 90 degrees and smaller than about 180 degrees. When the above angle range is satisfied, the third light RL3, which is generated when the second light RL2 is reflected by the reflective surface 5121, travels toward the display panel 100 (see FIG. 1). Accordingly, when the cover parts 512 are disposed in a dark portion of the backlight unit, the dark portion of the backlight unit may be brightened by the third light RL3. Accordingly, the cover parts 512 are disposed in portions of the backlight unit with a low brightness, where the portions are in the vicinity of the peripheral edges of the backlight unit. Thus, as described above, the cover parts 512 may be disposed along the vicinity of the peripheral edges of the bottom part 511 to surround the light source member 200 in the top plan view.

The second reflective sheet 520 is disposed in the vicinity of the peripheral edges of the first reflective sheet 510. The first and second reflective sheets 510 and 520 may be integrally formed.

A third angle θ3 defined by the bottom part 511 of the first reflective sheet 510 and the second reflective sheet 520 is greater than about 90 degrees and smaller that about 180 degrees. Where the third angle θ3 is greater than about 90 degrees and smaller that about 180 degrees, the second light RL2 is reflected toward the display panel 100 (see FIG. 1) after being incident on the second reflective sheet 520. The second light RL2 is reflected toward the display panel 100 (see FIG. 1) after being incident on an inner surface of the second reflective sheet 520 which faces the light source member 200. Accordingly, the brightness of the portion of the second reflective sheet 520 is generally higher than that at the vicinity of the edges of the first reflective sheet 510, in the top plan view of the bottom part 511.

Here, when the cover parts 512 at the vicinity of the edges of the first reflective sheet 510 block the second light RL2 from reaching the second reflective sheet 520 to form a shadow on portions of the second reflective sheet 520, the brightness of the second reflective sheet 520 may be lowered.

That is, the cover parts 512 raise the brightness of the vicinity of the edges of the first reflective sheet 510 and lower the brightness at the second reflective sheet 520, so that light which has entirely uniform brightness may be provided to the display panel 100 (see FIG. 1). The portions with the relatively high brightness and the relatively low brightness in the backlight unit will be described below in detail with reference to FIG. 4.

The protective members 610 and 620 include an upper protective member 610 and a lower protective member 620.

The upper and lower protective members 610 and 620 are coupled to each other. The upper and lower protective members 610 and 620 may include or be formed of metal or plastic.

The upper protective member 610 includes a first upper protective member 611 disposed at an upper side of the display panel 100, and a second upper protective member 612 disposed at a side surface of the display panel 100. The first upper protective member 611 includes defined therein an opening part 611-OP through which an image displayed by the display panel 100 is viewable at a viewing side of the display device. The opening part 611-OP corresponds to the display region of the display panel 100. The first upper protective member 611 may be extended to define the second upper protective member 612 of the upper protective member 610, but is not limited thereto.

The lower protective member 620 is disposed under the reflective sheet 500. The lower protective member 620 includes a first lower protective member 621 disposed under the reflective sheet 500 and a second lower protective member 622 disposed at a side surface of the display panel 100. The second lower protective member 622 extends to be bent from edges of the first lower protective member 621. The angle defined by the first lower protective member 621 and the second lower protective member 622 may be equal to the angle defined by the first reflective sheet 510 and the second reflective sheet 520. The first and second lower protective members 621 and 622 may be integrated with each other, for example, the first lower protective member 621 may be extended to define the second lower protective member 622. Alternatively, the second lower protective member 622 may be removably disposed with respect to the first lower protective member to be separately coupled to the first lower protective member 621.

Figure 4A:
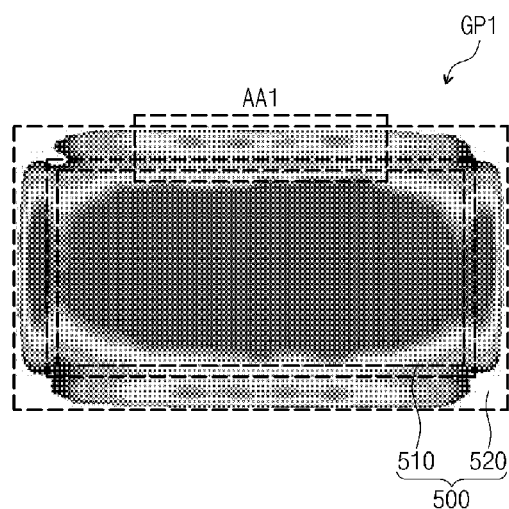
FIGS. 4A and 4B are images respectively illustrating a measured result of the brightness of a conventional backlight unit and a measured result of the brightness of an exemplary embodiment of a backlight unit according to the invention.
Figure 4B:
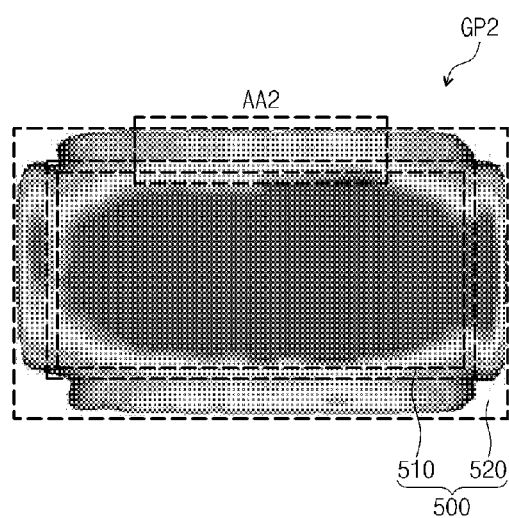

FIGS. 4A and 4B are views respectively illustrating a measured result of the brightness of a conventional backlight unit and a measured result of the brightness of a backlight unit according to the invention.

A first brightness measured result GP1 in FIG. 4A illustrates the brightness measured result of a conventional backlight unit. A second brightness measured result GP2 in FIG. 4B illustrates the brightness measured result of an exemplary embodiment of a backlight unit according to the invention.

The portion of the highest brightness is expressed in red, and as the brightness becomes lower, the portions with the lower brightness are sequentially expressed in yellow, green, blue, and dark blue.

The first brightness measured result GP1 is mainly described with respect to a first region AA1. In the first region AA1, the portion overlapping the second reflective sheet 520 is expressed in red or yellow, and the portion overlapping the edge of the first reflective sheet 510 is expressed in green. Through this, it may be seen that the brightness of the region of the second reflective sheet 520 is higher than that of the edge portion of the first reflective sheet 510 for the reasons described above with respect to FIG. 3.

The second brightness measured result GP2 is mainly described with respect to a second region AA2. The second region AA2 is a region corresponding to the first region AA1 of the first brightness measured result GP1. In the second region AA2, the portion overlapping the second reflective sheet 520 is expressed in light yellow or green, and the portion overlapping the edge of the first reflective sheet 510 is expressed in red, yellow or green. Through this, it may be seen that in the exemplary embodiment of the backlight assembly, the brightness of the region of the second reflective sheet 520 is similar to that of the edge portion of the first reflective sheets 510.

When comparing the first region AA1 and the second region AA2, in the exemplary embodiment of the backlight unit according to the invention, compared to a conventional backlight unit, the brightness of the portion corresponding to the second reflective sheet 520 is relatively low, and the brightness of the portion corresponding to the edge of the first reflective sheet 510 is relatively high.

Accordingly, in the exemplary embodiment of the backlight unit according to the invention, the brightness of the portion corresponding to the edge of the first reflective sheet 510 and the brightness of the portion corresponding to the second reflective sheet 520 become approximately the same.

As described above, the reason for such changes in brightness from the conventional backlight unit is that the cover parts 512 (see FIG. 2) are disposed along the edge portions of the first reflective sheet 510 within the exemplary embodiment of the backlight unit according to the invention. The light generated by the light source member 200 (see FIG. 2) is blocked by the cover parts 512, so that a shadow forms on a portion of the second reflective sheet 520. Thus, according to an exemplary embodiment of the invention, the brightness of the shadowed portion of the second reflective sheet 520 becomes lower. Conversely, the light incident on the cover parts 512 is reflected toward the display panel 100 (see FIG. 1), so that the brightness of the portion corresponding to the edges of the first reflective sheet 510 becomes higher.

Figure 5:
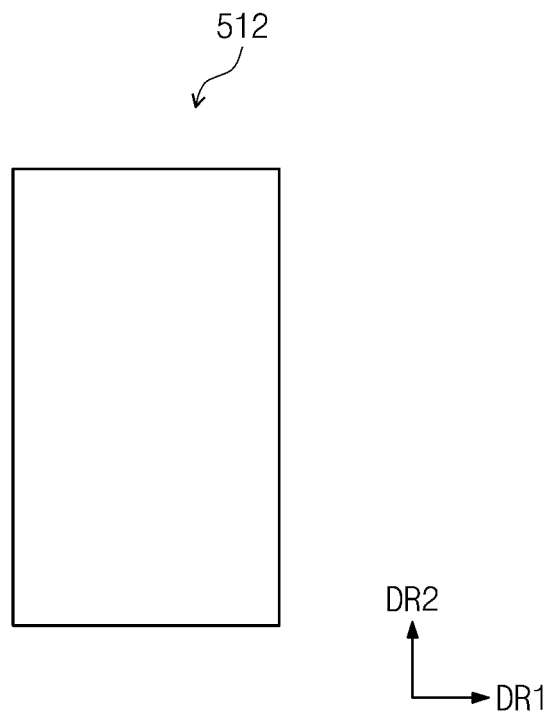
FIG. 5 is a plan view illustrating an exemplary embodiment of a cover part of the reflective sheet illustrated in FIG. 2.

FIG. 5 is a plan view illustrating an exemplary embodiment of a cover part illustrated in FIG. 2. In FIG. 5, the cover part 512 having a rectangular planar shape is illustrated.

Where the cover part 512 is extended from the bottom part 511 (see FIG. 1), the cover part 512 is connected to the bottom part 511 at a side of the cover part 512. Referring to FIG. 5, a length of the connected side of the cover part 512 extends in a first direction DR1. The cover part 512 extends from the bottom part 511 (see FIG. 1) toward the display panel 100 (see FIG. 1) in a second direction DR2 perpendicular to the first direction DR1.

A length of the cover part 512 is measured in the second direction DR2, and the width is measured in the first direction DR1. The width of the cover part 512 illustrated in FIG. 5 is constant along an entire length thereof. The width of the cover part 512 may be a maximum dimension of the cover part 512 in the first direction DR1, at a point along the length, and the length of the cover part 512 may be a maximum dimension of the cover part 512 in the second direction DR2.

There are no limits to the length, width or the ratio of the length to the width of the cover part 512, and these characteristic may vary according to the characteristics of the first reflective sheet 510 and/or the second reflective sheet 520.

FIGS. 6A to 6D are plan views illustrating other exemplary embodiments of cover parts according to the invention. For the cover parts in FIGS. 6A to 6D, the definitions of the first direction DR1 and second direction DR2 are the same as described for FIG. 5. In addition, the definitions of the lengths and the widths of the cover parts are also the same as described for FIG. 5.

Figure 6A:
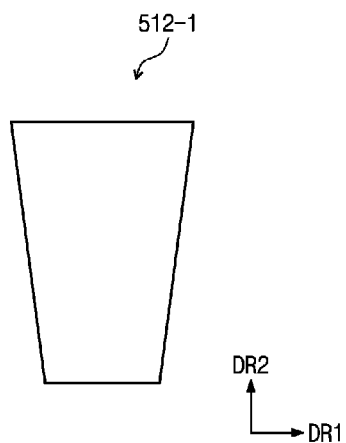
FIGS. 6A to 6D are plan views illustrating other exemplary embodiments of cover parts according to the invention.

In FIG. 6A, a plan view of another exemplary embodiment of a cover part 512-1 according to the invention is illustrated.

The cover part 512-1 has a rectangular (e.g., polygonal) planar shape having a width varying according to a measuring point along the length. In FIG. 6A, a shape for which has a width thereof increases toward the upper side thereof in the second direction DR2 is illustrated, but is not limited thereto. Alternatively, the cover part may be a shape for which a width thereof decreases toward an upper side thereof in the second direction DR2. The length of the cover part 512 may be a maximum dimension of the cover part 512 in the second direction DR2 and a width of the cover part 512 may be a maximum dimension of the cover part 512 in the first direction DR1 at a point along the length.

Figure 6B:
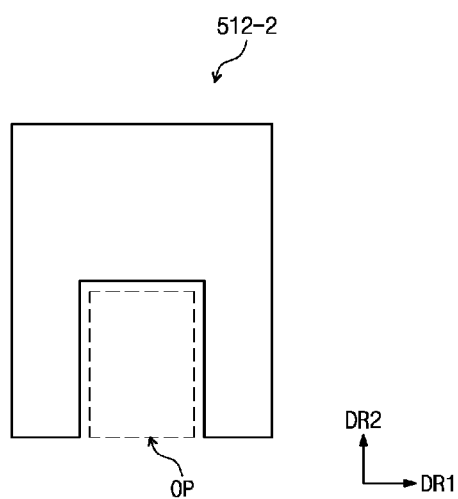

In FIG. 6B, a plan view of another exemplary embodiment of a cover part 512-2 according to the invention is illustrated.

The cover part 512-2 has a shape which defines an opening part OP in a lower portion thereof in the second direction DR2. One portion of the second light RL2 (see FIG. 3) is transmitted through the opening part OP, and a different portion of the second light RL2 (see FIG. 3) is reflected by the cover part 512-2 to become the third light RL3 (see FIG. 3).

Figure 6C:
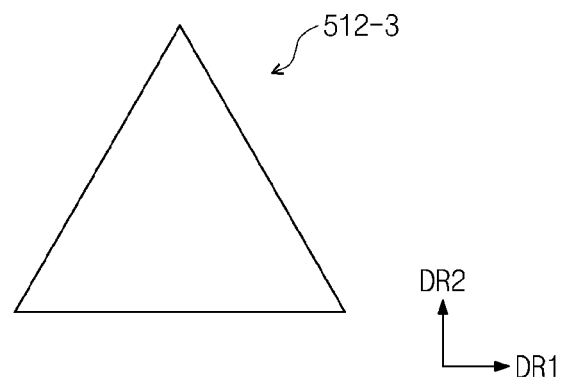

In FIG. 6C, a plan view of another exemplary embodiment of a cover part 512-3 according to the invention is illustrated.

The cover part 512-3 illustrated in FIG. 6C has a triangular shape. The width of the cover part 512-3 decreases toward an upper side thereof in the second direction DR2.

Figure 6D:
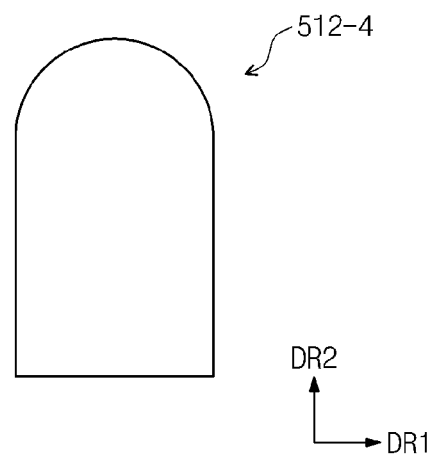

In FIG. 6D, a plan view of another exemplary embodiment of a cover part 512-4 according to the invention concept is illustrated.

The shape of the cover part 512-4 is not limited to a polygonal shape, and may be a shape including a curved portion. As illustrated in FIG. 6D, for example, a curved portion which is convex at an upper end portion thereof in the second direction DR2 may be defined. However, the invention is not limited thereto, and the curved portion may be disposed at any portion of the cover part.

The planar shapes of the cover parts 512 to 512-4 are not limited to the shapes illustrated in FIGS. 5 to 6D. In exemplary embodiments, for example, the cover parts 512 to 512-4 may have widths gradually becoming wider or narrower from the bottom part 511 (see FIG. 2) in the second direction DR2.

Figure 7:
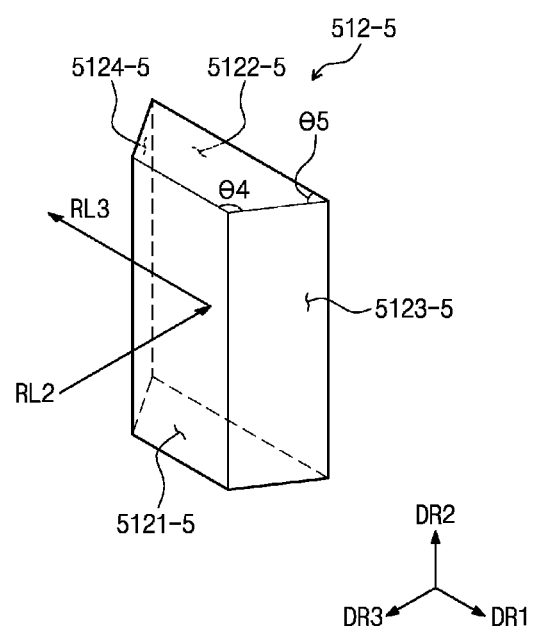
FIG. 7 is a perspective view illustrating still another exemplary embodiment of a cover part according to the invention.

FIG. 7 is a perspective view illustrating still another exemplary embodiment of a cover part according to the invention.

The definitions of the first direction DR1 and the second direction DR2 are the same as those for FIG. 5. In addition, the definitions of the length and the width of the cover part 512-5 are also the same as those for FIG. 5. The direction of the normal line to the plane defined by the first and second directions DR1 and DR2 is referred to as the third direction DR3. The cover part 512-5 has a predetermined thickness in the third direction DR3.

As illustrated in FIG. 7, the cover part 512-5 has a solid shape having a length, a width and a thickness.

The cover part 512-5 includes a reflective surface 5121-5, non-reflective surface 5122-5, a first side surface 5123-5, and a second side surface 5124-5.

The third light RL3 is generated through reflecting the second light RL2 by the reflective surface 5121-5. The non-reflective surface 5122-5 is disposed opposite the reflective surface 5121-5 in the third direction DR3. The first side surface 5123-5 and the second side surface 5124-5 are surfaces connecting the reflective surface 5121-5 and the non-reflective surface 5122-5 to each other. As illustrated in FIG. 7, the planar area of the reflective surface 5121-5 may be smaller than that of the non-reflective surface 5122-5.

A fourth angle θ4 defined by each of the first side surface 5123-5 and the second side surface 5124-5 with respect to the reflective surface 5121-5 is greater than about 90 degrees and smaller than about 180 degrees. Conversely, a fifth angle θ5 defined by each of the first side surface 5123-5 and the second side surface 5124-5 with respect to the non-reflective surface 5122-5 is greater than about 0 degrees and smaller than about 90 degrees. The sum of the fourth angle θ4 and the fifth angle θ5 is 180 degrees. The first side surface 5123-5 and the second side surface 5124-5 may reflect the second light RL2 laterally in the first direction DR1.

However, the solid shape of the cover part 512-5 is not limited thereto, and may vary according to the brightness characteristics of a backlight unit. Through such a solid shape of the cover part 512-5, the brightness of a backlight unit may be allowed to be more uniform.

One or more exemplary embodiment of the present disclosure provides a liquid crystal display device capable of providing uniform light to a display panel.

While exemplary embodiments are described above, a person skilled in the art may understand that many modifications and variations may be made without departing from the spirit and scope of the invention defined in the following claims. Also, the exemplary embodiments disclosed in the present disclosure are not intended to limit the technical spirit of the invention, and the following claims and all technical spirits falling within equivalent scopes are to be construed as being included in the scope of rights of the invention.

What is claimed is:

1. A display device including:
a backlight unit which generates light; and
a display panel which receives the light to display an image,
wherein the backlight unit includes:
a light source member including a plurality of light emitting elements which generates the light, and
a first reflective sheet disposed under the light source member, the first reflective sheet including:
a bottom part which is extended to be disposed under the light source member, and
portions of the bottom part bent toward the display panel to define a plurality of opening parts in the bottom part and a plurality of cover parts respectively extended toward the display panel from one side of each of the opening parts,
wherein
the plurality of cover parts is in one-to-one correspondence with the plurality of opening parts, and
each of the plurality of cover parts is disposed between a corresponding opening part and the light source member.

2. The display device of claim 1, wherein an angle respectively defined by each of the plurality of cover parts and the bottom part is greater than about 90 degrees and smaller than about 180 degrees.

3. The display device of claim 2, wherein each of the plurality of light emitting elements includes:
a light emitting diode chip which generates the light; and
a lens which covers the light emitting diode chip and totally reflects the generated light toward the cover parts.

4. The display device of claim 3, wherein an angle defined by the totally reflected light toward the cover parts and a normal line to the bottom part defined by the first reflective sheet is about 70 to about 110 degrees.

5. The display device of claim 4, wherein the plurality of cover parts is disposed around the light source member in a top plan view.

6. The display device of claim 5, wherein the plurality of cover parts is disposed along edges of the bottom part to surround the light source member in the top plan view.

7. The display device of claim 6, wherein each of the plurality of cover parts includes:
a reflective surface disposed to face the light source member and on which the totally reflected light is incident; and
a non-reflective surface disposed opposite to the reflective surface and on which the totally reflected light is not incident.

8. The display device of claim 7, wherein the plurality of cover parts is disposed spaced apart from each other at a constant distance from one another.

9. The display device of claim 7, wherein
one portion of the cover parts from among the plurality of cover parts is arranged in one direction along the bottom part, and
among the cover parts in the one portion arranged in the one direction, distances between adjacent cover parts disposed at a center of the one portion are greater than distances between adjacent cover parts disposed at an end of the one portion.

10. The display device of claim 7, wherein the plurality of cover parts is disposed closer to the edges of the bottom part than to the light source member.

11. The display device of claim 7, wherein the plurality of cover parts has the same shape as each other.

12. The display device of claim 7, wherein each of the plurality of cover parts has a polygonal shape.

13. The display device of claim 7, wherein
each of the plurality of cover parts has a length in a direction from the bottom part toward the display panel and a width parallel to bottom part, and
the width of each of the plurality of cover parts becomes smaller from the bottom part toward the display panel.

14. The display device of claim 7, wherein
each of the plurality of cover parts has a length in a direction from the bottom part toward the display panel and a width parallel to bottom part, and
the width of each of the plurality of cover parts becomes larger from the bottom part toward the display panel.

15. The display device of claim 7, wherein each of the plurality of cover parts has a shape including a curved portion.

16. The display device of claim 7, wherein each of the plurality of cover parts has a predetermined thickness between the reflective surface and the non-reflective surface, a side surface connecting the reflective surface and the non-reflective surface is defined by the predetermined thickness, and the side surface defines an angle greater than about 90 degrees and smaller than about 180 degrees with the reflective surface.

17. The display device of claim 7, wherein
the backlight unit further includes a second reflective sheet extended from the edges of the bottom part defined by the first reflective sheet, and
the second reflective sheet defines an angle greater than about 90 degrees and smaller than about 180 degrees with the bottom part defined by the first reflective sheet.

18. The display device of claim 17, further including a lower protective member disposed under the first reflective sheet, the lower protective member comprising:
a first lower protective member corresponding to the bottom part defined by the first reflective sheet and overlapping the first reflective sheet; and
a second lower protective member corresponding to the second reflective sheet extended from the edges of the bottom part defined by the first reflective sheet and overlapping the second reflective sheet.

19. The display device of claim 18, wherein the first lower protective member and the second lower protective member are integral with each other.

20. A display device including:
a backlight unit which generates light; and
a display panel which receives the light to display an image,
wherein the backlight unit includes:
a light source member including a plurality of light emitting elements which generates the light, and
a first reflective sheet disposed under the light source member, the first reflective sheet including:
a bottom part which is extended to be disposed under the light source member, and
portions of the bottom part bent toward the display panel to define a plurality of opening parts in the bottom part and a plurality of cover parts respectively extended toward the display panel from one side of each of the opening parts,
wherein
the plurality of cover parts is in one-to-one correspondence with the plurality of opening parts,
the light source member is disposed between the plurality of cover parts, and
there is no cover part between the plurality of light emitting elements.

* * * * *